United States Patent
Tang (10) Patent No.: US 10,972,965 B2
(45) Date of Patent: Apr. 6, 2021

(54) METHOD AND APPARATUS FOR WIRELESS FIDELITY FAST CONNECTION

(71) Applicant: Guangdong Oppo Mobile Telecommunications Corp., Ltd., Guangdong (CN)

(72) Inventor: Rongzheng Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 254 days.

(21) Appl. No.: 16/311,088

(22) PCT Filed: Oct. 11, 2017

(86) PCT No.: PCT/CN2017/105776
§ 371 (c)(1),
(2) Date: Dec. 18, 2018

(87) PCT Pub. No.: WO2018/103451
PCT Pub. Date: Jun. 14, 2018

(65) Prior Publication Data
US 2020/0314734 A1    Oct. 1, 2020

(30) Foreign Application Priority Data
Dec. 7, 2016 (CN) .......................... 201611118637.6

(51) Int. Cl.
*H04W 4/70* (2018.01)
*H04W 48/16* (2009.01)
(Continued)

(52) U.S. Cl.
CPC ............ *H04W 48/16* (2013.01); *H04W 4/70* (2018.02); *H04W 48/20* (2013.01);
(Continued)

(58) Field of Classification Search
CPC ... H04W 4/21; H04W 12/0612; H04W 12/06; H04W 72/00; H04W 76/10; H04W 84/12;
(Continued)

(56) References Cited

U.S. PATENT DOCUMENTS 7,441,043 B1 * 10/2008 Henry ................. H04L 69/18
709/238
9,894,604 B1 * 2/2018 Tran ...................... H04W 48/20
(Continued)

FOREIGN PATENT DOCUMENTS

CN    103415013 A    11/2013
CN    103458409 A    12/2013
(Continued)

OTHER PUBLICATIONS

International search report issued in corresponding international application No. PCT/CN2017/105776 dated Jan. 8, 2018.
(Continued)

*Primary Examiner* — Jean A Gelin (57) ABSTRACT

A method and an apparatus for wireless fidelity (Wi-Fi) fast connection are provided. The method includes the following. After a terminal device detects Wi-Fi is turned on by a user, a Wi-Fi driver is loaded and wpa_supplicant is started as a support library of Wi-Fi protected access (WPA). After determining that the wpa_supplicant is started, the terminal device sends a scanning command and performs a scanning operation, and performs, in parallel with sending the scanning command and performing the scanning operation, operations of loading pre-stored access points, setting all the pre-stored access points to be connectable, updating a current connection state, turning on Wi-Fi peer-to-peer, and setting parameters of the Wi-Fi peer-to-peer. After setting the parameters of the Wi-Fi peer-to-peer, the terminal device
(Continued)

connects to a first access point according to the scanning result of the scanning operation.

11 Claims, 2 Drawing Sheets

(51) Int. Cl.
  *H04W 76/11* (2018.01)
  *H04W 48/20* (2009.01)
  *H04W 72/08* (2009.01)
  *H04W 84/12* (2009.01)
(52) U.S. Cl.
  CPC .......... *H04W 72/085* (2013.01); *H04W 76/11* (2018.02); *H04W 84/12* (2013.01)
(58) Field of Classification Search
  CPC ..... H04W 84/18; H04W 84/22; H04W 8/005; H04W 48/20; H04W 74/10; H04W 4/70; H04W 72/085; H04W 76/11; H04W 46/16
  See application file for complete search history.

(56) References Cited

U.S. PATENT DOCUMENTS

| | | | |
|---|---|---|---|
| 2004/0110530 A1 | 6/2004 | Alone et al. | |
| 2008/0293404 A1* | 11/2008 | Scherzer | H04W 72/00 455/426.1 |
| 2012/0251994 A1* | 10/2012 | Gray | G09B 7/00 434/362 |
| 2013/0100819 A1* | 4/2013 | Anchan | H04W 48/20 370/241 |
| 2013/0235861 A1 | 9/2013 | Balasubramanian et al. | |
| 2014/0064171 A1* | 3/2014 | Zhou | H04W 52/0225 370/311 |
| 2014/0075523 A1* | 3/2014 | Tuomaala | H04W 12/003 726/6 |
| 2014/0079022 A1* | 3/2014 | Wang | H04W 36/22 370/331 |
| 2014/0179237 A1 | 6/2014 | Gao et al. | |
| 2014/0293829 A1* | 10/2014 | Visuri | H04M 15/8351 370/254 |
| 2015/0036662 A1 | 2/2015 | Chen et al. | |
| 2015/0072614 A1* | 3/2015 | Holtman | H04W 24/02 455/39 |
| 2016/0081130 A1 | 3/2016 | Wang et al. | |
| 2016/0150537 A1* | 5/2016 | Jung | H04W 4/80 455/452.1 |
| 2016/0345269 A1 | 11/2016 | Basehore et al. | |
| 2017/0048785 A1* | 2/2017 | Ge | H04W 48/16 |
| 2017/0094652 A1* | 3/2017 | Yang | H04W 72/048 |
| 2017/0272317 A1* | 9/2017 | Singla | H04L 67/02 |
| 2019/0158180 A1* | 5/2019 | Wang | H04W 52/0203 |

FOREIGN PATENT DOCUMENTS

| | | |
|---|---|---|
| CN | 104093194 A | 10/2014 |
| CN | 104902543 A | 9/2015 |
| CN | 105491642 A | 4/2016 |
| CN | 105530643 A | 4/2016 |
| CN | 105744598 A | 7/2016 |
| CN | 105873098 A | 8/2016 |
| CN | 105916103 A | 8/2016 |
| CN | 106162830 A | 11/2016 |

OTHER PUBLICATIONS

First examination report issued in corresponding in application No. 201917000507 dated Aug. 13, 2020.
English translation of the first OA issued in corresponding CN application No. 201611118637.6 dated Apr. 2, 2019.
Extended European search report issued in corresponding European application No. 17879102.6 dated Apr. 12, 2019.
Examination report issued in corresponding European application No. 17879102.6 dated Apr. 15, 2020.

* cited by examiner

METHOD AND APPARATUS FOR WIRELESS FIDELITY FAST CONNECTION

CROSS-REFERENCE TO RELATED APPLICATION(S)

This application is a 371 application of International Application No. PCT/CN2017/105776, filed on Oct. 11, 2017, the entire disclosure of which is hereby incorporated by reference.

TECHNICAL FIELD

This disclosure relates to the technical field of communications, and more particularly, to a method and an apparatus for wireless fidelity (Wi-Fi) fast connection.

BACKGROUND

Terminal devices in the communication field, such as mobile phones and tablet computers, are commonly used by users. The terminal devices with their own operating systems are also called smart terminals or smart phones. The "smart phone" is a collective term for the mobile phone with better computing power and better functions than the conventional mobile phone.

The smart phone has two ways to access the Internet. One way is to access the Internet through a mobile communication network, such as a third generation (3G) network, a fourth generation (4G) network, and the like. The other way is to access the Internet through a local area network, most commonly using a Wi-Fi technology. However, currently it may take a long time to connect to Wi-Fi, which affects the user experience.

SUMMARY

Disclosed herein are implementations of a method and an apparatus for Wi-Fi fast connection, to mainly solve the shortcomings of long time required for Wi-Fi connection which affects the user experience.

According to a first aspect of the present disclosure, a method for Wi-Fi fast connection is provided. The method includes the following. After a terminal device detects Wi-Fi is turned on by a user, a Wi-Fi driver is loaded and wpa_supplicant is started as a support library of Wi-Fi protected access (WPA). After determining that the wpa_supplicant is started, the terminal device sends a scanning command and performs a scanning operation, and performs, in parallel therewith, operations of loading pre-stored access points, setting all the pre-stored access points to be connectable, updating a current connection state, turning on Wi-Fi peer-to-peer (P2P), and setting parameters of the Wi-Fi P2P. After setting the parameters of the Wi-Fi P2P, the terminal device connects to a first access point according to a scanning result of the scanning operation.

According to a second aspect of the present disclosure, an apparatus for Wi-Fi fast connection is provided. The apparatus includes at least one processor and a computer readable storage. The computer readable storage is coupled to the at least one processor and stores at least one computer executable instruction thereon which, when executed by the at least one processor, causes the at least one processor to carry out the following. A Wi-Fi driver is loaded and wpa_supplicant is started as a support library of WPA after Wi-Fi is detected to be turned on by a user. A scanning command is sent and a scanning operation is performed, and, in parallel therewith, operations of loading pre-stored access points, setting all the pre-stored access points to be connectable, updating a current connection state, turning on Wi-Fi P2P, and setting parameters of the Wi-Fi P2P are performed, after the wpa_supplicant is determined to be started. A first assess point is connected according to a scanning result of the scanning operation after the parameters of the Wi-Fi P2P are set.

In one implementation, the processing unit is further configured to disconnect from the first access point, to save connection information of the first access point after a screen is locked, and to directly connect to the first access point after the screen is unlocked.

In one implementation, the processing unit is further configured to search for a second access point with the strongest signal strength from the scanning result, to set the second access point as an alternative access point of the first access point, and to directly connect to the second access point when the apparatus disconnects from the first access point.

In one implementation, the processing unit is further configured to collect access point IDs, coordinate information, and time information when the apparatus connects to access points, to establish a mapping relationship table of the coordinate information, the time information, and the access point IDs, to monitor first coordinate information and first time information of the apparatus in real time, and to connect to a third access point selected from the mapping relationship table corresponding to the first coordinate information and the first time information when a relationship between the first coordinate information and the first time information matches a relationship between the coordinate information and the time information in the mapping relationship table.

In one implementation, the processing unit is further configured to acquire coordinate information of the user, to extract an ID of a historical access point and the number of historical accessed times of the historical access point corresponding to the coordinate information, and to directly connect to a fourth access point with the greatest number of the historical accessed times when the apparatus disconnects from the first access point.

According to a third aspect of the present disclosure, a smart terminal is provided. The smart terminal includes a processor, a memory, a transceiver, and a bus. The memory, the processor, and the transceiver are coupled through the bus. The memory is configured to store program codes therein. The processor is configured to invoke the program codes stored in the memory to execute the method for Wi-Fi fast connection provided by the first aspect of the implementation of the present disclosure.

According to a third aspect of the present disclosure, a non-transitory computer readable storage medium storing program codes is provided. The program codes which, when executed by a processor, are operable with the processor to carry out the following. A Wi-Fi driver is loaded and wpa_supplicant is started as a support library of WPA after Wi-Fi is detected to be turned on by a user. A scanning command is sent and a scanning operation is performed, and in parallel therewith, operations of loading pre-stored access points, setting all the pre-stored access points to be connectable, updating a current connection state, turning on Wi-Fi P2P, and setting parameters of the Wi-Fi P2P are performed, after the wpa_supplicant is determined to be started. A first assess point is connected according to a scanning result of the scanning operation after the parameters of the Wi-Fi P2P are set.

Those skilled in the art will acknowledge that the following detailed description will be made with reference to the illustrated implementations and accompanying drawings, but the present disclosure is not limited thereto. Instead, the scope of the present disclosure is broad and is intended to be limited only by the scope of the appended claims.

BRIEF DESCRIPTION OF DRAWINGS

Other features, objects, and advantages of the present disclosure will become more clearly from the detailed description of the nonrestrictive implementations with reference to the following accompanying drawings.

DETAILED DESCRIPTION

It should be noted that some exemplary implementations are described as processes or methods depicted as flow chart before discussing exemplary implementations in more detail. Although various operations described in the flow chart are implemented in order, many of the operations therein may be implemented in parallel, concurrently, or simultaneously. In addition, the order of the various operations may be rearranged. When the operations are completed, the process may be terminated, but the implementations may also include additional steps not included in the accompanying drawings. The process may correspond to a method, a function, a procedure, a subroutine, a subprogram, and the like.

"Computer device" in the context, also named as "computer", refers to a smart electronic device that executes predetermined programs or instructions to execute predetermined processes such as numerical calculation and/or logic calculation. The smart electronic device may include a processor and a memory. The predetermined processes can be executed by the processor executing pre-stored instructions in the memory, or by hardware such as an application specific integrated circuit (ASIC), a field-programmable gate array (FPGA), a digital signal processor (DSP), or the like, or by a combination thereof. The computer device includes, but is not limited to, a server, a personal computer, a laptop computer, a tablet computer, a smartphone, and the like.

The methods discussed hereafter, some of which are illustrated by flow charts, may be implemented in hardware, software, firmware, middleware, microcode, hardware description language, or any combination thereof. When implemented in the software, the firmware, the middleware, or the microcode, program codes or code segments to carry out necessary tasks may be stored in a machine or a computer readable medium, such as a storage medium. One or more processors may implement the necessary tasks.

The specific structures and function details disclosed herein are merely illustrative and are for describing exemplary implementations of the present disclosure. The present disclosure may be implemented in many alternative forms and should not be only construed and limited to the implementations described herein.

It is to be understood that, although the terms "first", "second", and the like may be used herein to describe the various units, these units should not be limited to these terms. These terms are used only to distinguish one unit from another unit. For example, a first unit may be named a second unit, and similarly a second unit may be named a first unit, without departing from the scope of the exemplary implementations. The term "and/or" used herein includes any and all combinations of one or more of associated listed items.

The terms used herein are for describing the particular implementations only and are not intended to limit the exemplary implementations. The singular form "a" or "an" is intended to include plural unless the context clearly dictates otherwise. It is also to be understood that the terms "comprise" and/or "include" used herein specify the existence of features, integers, steps, operations, units, components and/or combinations thereof described and do not exclude the existence and addition of one or more other features, integers, steps, operations, units, components, and/or combinations thereof.

It should also be noted that, the functions/actions recited in some alternative implementations may occur in a different order than that illustrated in the accompanying drawings. For example, the function/actions illustrated in two consecutive accompany drawings may substantially be executed concurrently or in a reverse order in practice, depending on the function/actions involved.

The present description will be further described in detail below with reference to the accompanying drawings.

Figure 1:
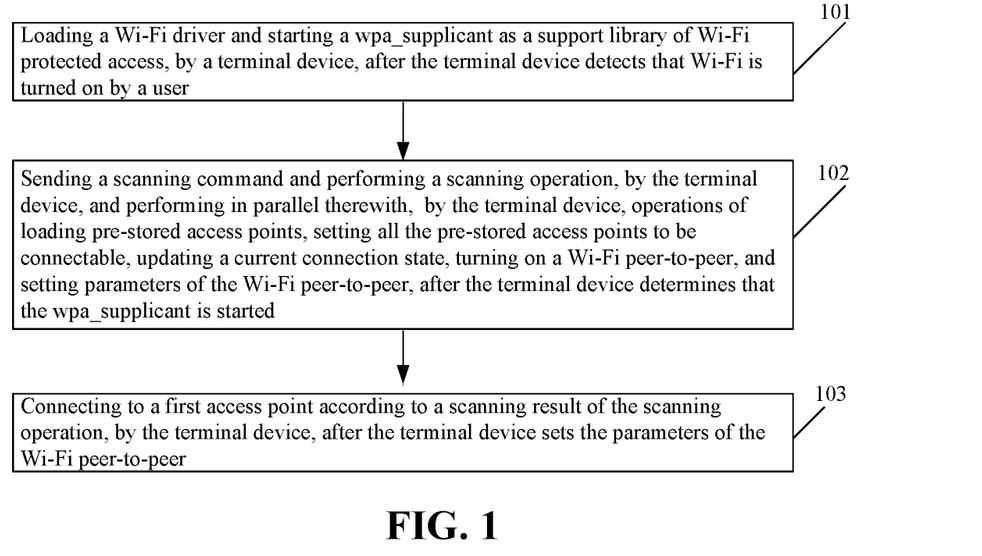
FIG. 1 is a schematic flow chart illustrating a method for Wi-Fi fast connection according to an implementation of the present disclosure.

According to a first aspect of the present disclosure, a method for Wi-Fi fast connection is provided. The method is implemented by a terminal device. The terminal device may be a smart device such as a mobile phone, a tablet computer, a smart watch, a smart bracelet, a personal digital assistant, and the like. As illustrated in FIG. 1, the method includes the following.

At block 101, after detecting that Wi-Fi is turned on by a user, the terminal device loads a Wi-Fi driver and starts wpa_supplicant as a support library of Wi-Fi protected access (WPA).

Implementation methods of the foregoing operations at block 101 may be the following.

For example, a touch display screen may be set on the terminal device. A setting interface is displayed on the touch display screen. A switch for turning on or turning off the Wi-Fi is provided on the setting interface for the user to operate. For example, when the user switches on the Wi-Fi, the terminal device may detect that the Wi-Fi is turned on by the user.

For another example, a control command may be sent to the terminal device to turn on the Wi-Fi. When receiving the control command, the terminal device determines that the Wi-Fi is turned on by the user. The foregoing control command may be sent in a wireless manner, which includes, but is not limited to, 3G network, 4G network, Bluetooth, and the like. The control command may be sent by other terminals coupled to the terminal device, such as, a smart watch, a smart bracelet, and the like. Of course, the control command may also be sent by other devices. The implementations of the present disclosure are not limited to the specific command sending manners described above.

At block 102, after determining the wpa_supplicant is started, the terminal device sends a scanning command and performs a scanning operation, and performs, in parallel therewith, by the terminal device, operations of loading pre-stored access points (APs), setting all the pre-stored APs to be connectable, updating a current connection state, turning on Wi-Fi peer-to-peer (P2P), and setting parameters of the Wi-Fi P2P.

It should be noted that the above sending the scanning command and performing the scanning operation are performed in parallel with the operations of loading pre-stored access points, setting all the pre-stored access points to be connectable, updating the current connection state, turning on the Wi-Fi P2P, and setting the parameters of the Wi-Fi P2P, which can save the time of connecting to the AP.

At block 103, after setting the parameters of the Wi-Fi P2P, the terminal device connects to a first AP according to a scanning result of the scanning operation.

The method provided by the present disclosure may speed up connecting to the AP. The reason is that after the wpa_supplicant is determined to be started, the scanning operation are performed in parallel with the operations of loading pre-stored access points, setting all the pre-stored access points to be connectable, updating the current connection state, turning on Wi-Fi P2P, and setting the parameters of the Wi-Fi P2P. Therefore, the scanning result of the scanning operation is generated when the parameters of the Wi-Fi P2P are set. As a result, the terminal device may connect to the access point quickly according to the scanning result of the scanning operation, thereby achieving the advantage of saving the time of connecting to the AP.

Figure 2:
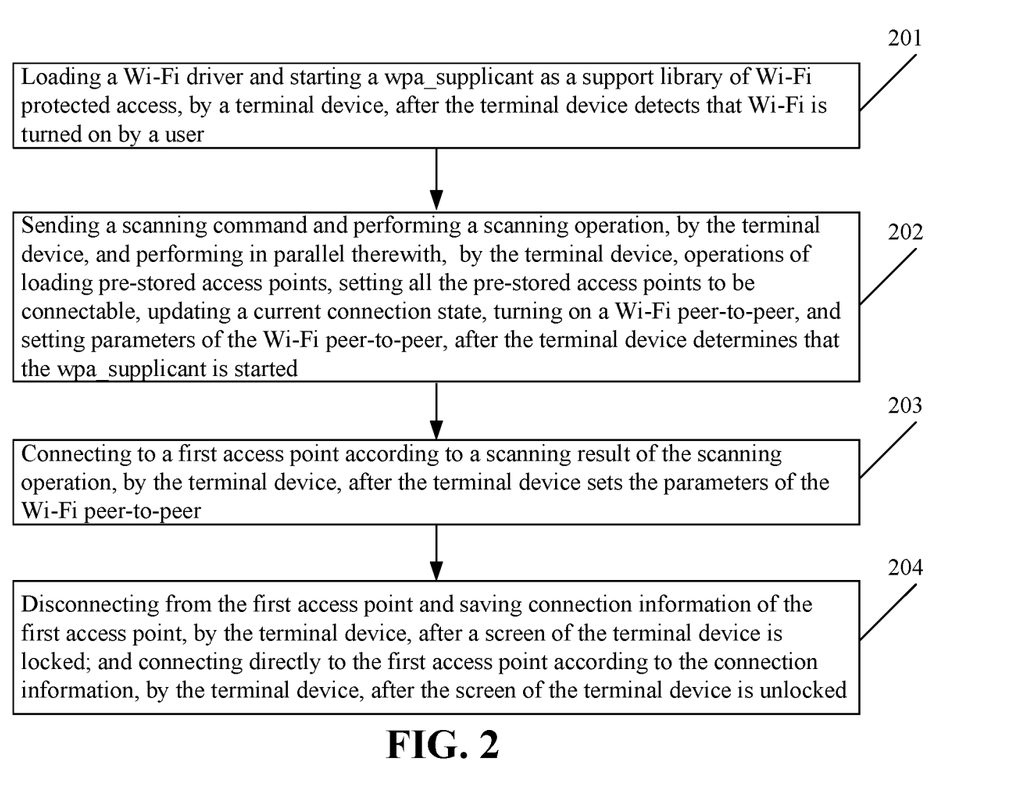
FIG. 2 is a schematic flow chart illustrating a method for Wi-Fi fast connection according to another implementation of the present disclosure.

According to another aspect of the present disclosure, a method for Wi-Fi fast connection is provided. The method is implemented by a terminal device. The terminal device may be a mobile phone, a tablet computer, a smart watch, a smart bracelet, a personal digital assistant, and the like. As illustrated in FIG. 2, the method includes the following.

At block 201, after detecting that Wi-Fi is turned on by a user, the terminal device loads a Wi-Fi driver and starts wpa_supplicant as a support library of WPA.

An implementation method of the foregoing operations at block 201 may be the following.

For example, a touch display screen may be set on the terminal device. A setting interface is displayed on the touch display screen. A switch for turning on or turning off the Wi-Fi is provided on the setting interface for the user. For example, when the user switches on the Wi-Fi, the terminal device may detect that the Wi-Fi is turned on by the user.

For another example, a control command may be sent to the terminal device to turn on the Wi-Fi. When receiving the control command, the terminal device determines that the Wi-Fi is turned on by the user. The foregoing control command may be sent in a wireless manner, which includes, but is not limited to, 3G network, 4G network, Bluetooth, and the like. The control command may be sent other terminals coupled to the terminal device, such as, a smart watch, a smart bracelet, and the like. Of course, the control command may also be sent by other devices. The implementations of the present disclosure are not limited to the specific command sending manners described above At block 202, after determining the wpa_supplicant is started, the terminal device sends a scanning command and performs a scanning operation, and performs, in parallel therewith, operations of loading pre-stored APs, setting all the pre-stored APs to be connectable, updating a current connection state, turning on Wi-Fi P2P, and setting parameters of the Wi-Fi P2P.

It should be noted that the above sending the scanning command and performing the scanning operation are performed in parallel with the operations of loading pre-stored access points, setting all the pre-stored access points to be connectable, updating the current connection state, turning on the Wi-Fi P2P, and setting the parameters of the Wi-Fi P2P, which can save the time of connecting to the AP.

At block 203, after setting the parameters of the Wi-Fi P2P, the terminal device connects to a first AP according to a scanning result of the scanning operation.

At block 204, after a screen of the terminal device is locked, the terminal device disconnects from the first access point and saves the connection information of the first access point. After the screen of the terminal device is unlocked, the terminal device directly connects to the first access point according to the connection information.

The method provided by the present disclosure may speed up connecting to the AP. In addition, the terminal device disconnects from the first access point after the screen is locked and directly connects to the first access point after the screen is unlocked, which can save power without affecting connection of the first AP.

In one implementation, the method may further include the following after operations at block 203.

The terminal device searches for a second access point with the strongest signal strength from the scanning result, and sets the second access point as an alternative access point of the first access point. When disconnecting from the first access point, the terminal device directly connects to the second access point.

In one implementation, the method may further include the following after operations at block 203.

The terminal device collects access point IDs, coordinate information, and time information when the terminal device connects to access points. The terminal device establishes a mapping relationship table of the coordinate information, the time information and the access point IDs. The terminal device monitors first coordinate information and first time information of the terminal device in real time. When a relationship between the first coordinate information and the first time information matches a relationship between the coordinate information and the time information in the mapping relationship table, the terminal device connects to a third access point which is selected from the mapping relationship table and corresponds to the coordinate information and the time information in the mapping relationship table.

The settings above-described may facilitate the terminal device switching between different access points. The user is accustomed to consider two parameters when selecting the access point for connecting. One is time information, and the other is coordinate information, that is, address information. For example, user A often uses an AP A in a living room to access the Internet at 7:00 pm and often uses an AP B in a bedroom to access the Internet at 9:00 pm. The mapping relationship table may be established based on long-term collected information to analyze the habit of the user. In this way, when the relationship between the first coordinate information and the first time information matches the relationship between time information and coordinate information in the mapping relationship table, the access point corresponding to the time information and the coordinate information may be directly accessed rather than manually accessed by the user, which can improve the user experience.

In one implementation, the method may further include the following after operations at block 203.

The terminal device acquires coordinate information of the user and extracts the an ID of a historical access point and the number of historical accessed times of the historical access point corresponding to the coordinate information. When disconnecting from the first access point, the terminal device directly connects to a fourth access point with the greatest number of the historical accessed times.

The technical solution may select the access point to be connected according to the historical accessed times when the terminal device disconnects from the first access point. The coordinate information is considered, which can avoid failure of connection due to the non-correspondence between the access point and the coordinate information. The terminal device can reconnect to the access point without scanning again, thereby improving reconnection speed of the Wi-Fi.

Figure 3:
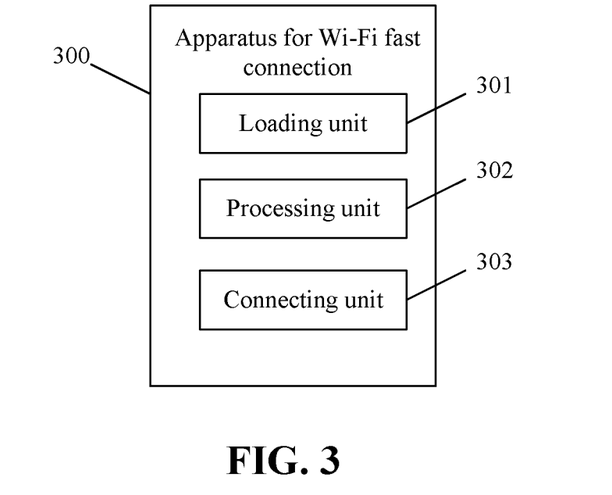
FIG. 3 is a schematic structural diagram illustrating an apparatus for Wi-Fi fast connection according to an implementation of the present disclosure.

FIG. 3 illustrates an apparatus 300 for Wi-Fi fast connection. The apparatus includes a loading unit 301, a processing unit 302, and a connecting unit 303.

The loading unit 301 is configured to load a Wi-Fi driver, and start wpa_supplicant as a support library of WPA, after Wi-Fi is detected to be turned on by a user.

The processing unit 302 is configured to send a scanning command and perform a scanning operation, and to perform, in parallel with sending the scanning command and performing the scanning operation, operations of loading pre-stored access points, setting all the pre-stored access points to be connectable, updating a current connection state, turning on Wi-Fi P2P, and setting parameters of the Wi-Fi P2P, after the wpa_supplicant is determined to be started.

The connecting unit 303 is configured to connect a first access point according to a scanning result of the scanning operation, after the parameters of the Wi-Fi P2P are set.

In one implementation, the processing unit 302 is further configured to disconnect from the first access point and save connection information of the first access point after a screen is locked, and to directly connect to the first access point according to the connection information after the screen is unlocked.

In one implementation, the processing unit 302 is further configured to search for a second access point with the strongest signal strength from the scanning result, to set the second access point as an alternative access point of the first access point, and to directly connect to the second access point when the apparatus disconnects from the first access point.

In one implementation, the processing unit 302 is further configured to collect access point IDs, coordinate information, and time information when the apparatus connects to access points, to establish a mapping relationship table of the coordinate information, the time information, and the access point IDs, to monitor first coordinate information and first time information of the apparatus in real time, and to connect to a third access point which is selected from the mapping relationship table and corresponds to the first coordinate information and the first time information when a relationship between the first coordinate information and the first time information matches a relationship between the coordinate information and the time information in the mapping relationship table.

In one implementation, the processing unit 302 is further configured to acquire coordinate information of the user, to extract an ID of a historical access point and the number of historical accessed times of the historical access point corresponding to the coordinate information; and directly connect a fourth access point with the greatest number of historical accessed times when the apparatus disconnects from the first access point.

Without departing from the spirit or essential features of the present disclosure, the details of the implementations of the present disclosure may be embodied in other specific forms to implement this disclosure. Therefore, from any point of view, the present implementations are to be considered as illustrative and not restrictive. The scope of the present disclosure is defined by the appended claims rather than the above descriptions. Thus, all changes intended to fall within the meaning and scope of the equivalents of the claims, are included in the present disclosure. Any reference signs in the claims should not be construed as limiting the claim. In addition, it is apparent that the term "comprise" or "include" does not exclude other elements or steps and singular does not exclude plural. The multiple units or devices recited in the system claims may also be replaced by one unit or device through software or hardware. Terms "first", "second", and the like are for denoting names and not for denoting any particular order.

The flow charts and block diagrams in the accompany drawings illustrate the architecture, function, and operation capable of being implemented by the systems, methods and computer program products according to multiply implementations of the present disclosure. In this regard, each block in the flow charts or block diagrams may represent a module, a program segment or part of code. Where the module, program segment or part of code includes one or more executable instructions for implementing the specified logic functions. It should also be noted that in some alternative implementations, the functions illustrated in the blocks may also occur in different orders than that illustrated in the accompany drawings. For example, operations at two consecutive blocks may be executed substantially in parallel and sometimes may be executed in the reverse order, according to the functions involved. It is also noted that each block of the block diagrams and/or flow charts and combinations of blocks in the block diagrams and/or flow charts may be implemented through a dedicated hardware-based system that executes specified functions or actions or a combination of dedicated hardware and computer instruction.

Figure 4:
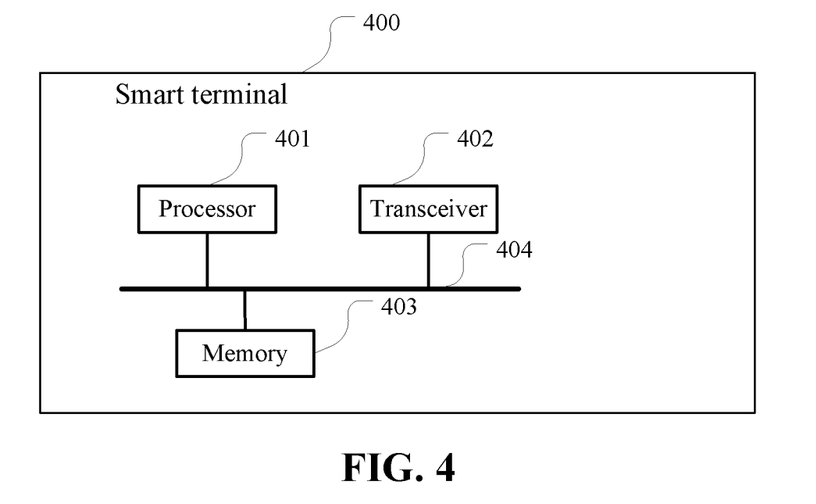
FIG. 4 is a schematic structural diagram illustrating a smart terminal according to an implementation of the present disclosure.

FIG. 4 illustrates a smart terminal 400 according to an implementation of the present disclosure. The smart terminal 400 includes, but is not limited to, a smartphone, a smart watch, a tablet computer, a personal computer, a notebook computer, or a computer group. As illustrated in FIG. 4, the smart terminal 400 includes a processor 401, a memory 403, a transceiver 402, and a bus 404. The transceiver 402 is configured to transmit and receive data to and from an external device. The terminal 400 may include one or more processor 401. In some implementations of the present disclosure, the processor 401, the memory 403, and the transceiver 402 may be coupled through a bus system or other means. The smart terminal 400 may be used to execute the methods illustrated in FIGS. 1 and 2. The meanings of the terms and examples involved in this implementation may refer to the descriptions corresponding to FIG. 1 and FIG. 2. Details are not described herein again.

The memory 403 is configured to store program codes. The processor 401 is configured to invoke the programs code stored in the memory 403 to execute the operations illustrated in FIG. 1 and FIG. 2.

It should be noted that the processor 401 may be a processing component, or a collective name of multiple processing components. For example, the processing component may be a central processing unit (CPU), an ASIC, or one or more integrated circuits configured to implement the implementations of the present disclosure, such as one or more DSPs, or one or more FPGAs.

The memory 403 may be a storage device or a collective name of multiple storage elements. The memory 403 is configured to store executable program codes or parameters, data, and the like required for running application programs by running devices. The memory 403 may include a random access memory (RAM), and may also include a non-volatile memory, such as a disk storage, a flash memory, and the like.

The bus 404 may be an industry standard architecture (ISA) bus, a peripheral component interconnect (PCI) bus, or an extended industry standard architecture (EISA) bus, and the like. The bus may be divided into an address bus, a data bus, a control bus, and the like. For ease of illustration, only one thick line is illustrated in FIG. 5, which does not mean that there is only one bus or one type of bus.

The smart terminal may further include input/output devices which are coupled to the bus 404 and coupled to other parts of the processor 401 through the bus 404. The input/output device may provide an input interface through which an operator may select control items. The input/output device may also be other interfaces through which other devices may be externally connected.

A storage medium is also provided. The storage medium is configured to store program codes. When the program code is executed, a processing unit is configured to perform the following.

After Wi-Fi is detected to be turned on by a user, a Wi-Fi driver is loaded and wpa_supplicant is started as a support library of WPA.

After the wpa_supplicant is determined to be started, a scanning command is send and a scanning operation is performed, and operations of loading pre-stored access points, setting all the pre-stored access points to be connectable, updating a current connection state, turning on Wi-Fi P2P, and setting parameters of the Wi-Fi P2P are performed in parallel therewith.

After the parameters of the Wi-Fi P2P are set, a first access point is connected according to a scanning result of the scanning operation.

In one implementation, the processor unit is further configured to perform the following.

After a screen is locked, the first access point is disconnected and the connection information of the first access point is saved. After the screen is unlocked, the first access point is directly connected according to the connection information.

In one implementation, the processor is further configured to perform the following.

A second access point with the strongest signal strength is searched from the scanning result. The second access point is set as an alternative access point of the first access point. When the first access point is disconnected, the second access point is directly connected.

In one implementation, the processor is further configured to perform the following.

Access point IDs, coordinate information, and time information are collected when a terminal device connects to the access points. A mapping relationship table of the coordinate information, the time information, and the access point IDs is established. The first coordinate information and the first time information of the terminal device are monitored in real time. When a relationship between the first coordinate information and the first time information matches a relationship between the coordinate information and the time information in the mapping relationship table, a third access point corresponding to the coordinate information and the time information in the mapping relationship table is selected to be connected.

In one implementation, the processor is further configured to perform the following.

Coordinate information of the user is acquired. An ID of a historical access point and the number of historical accessed times of the historical access point corresponding to the coordinate information are extracted. When the first access point is disconnected, a fourth access point with the greatest number of historical accessed time is directly connected.

It is clear to those skilled in the art that the specific working processes of the systems, apparatuses, and units described above may refer to the corresponding processes in the foregoing method implementations for the convenience and brevity of the description, which will not be described in further details herein.

It will be appreciated that the systems, apparatuses, and methods disclosed in implementations of the present disclosure may also be implemented in various other manners. For example, the above apparatus implementations are merely illustrative, e.g., the division of units is only a division of logical functions, and there may exist other ways of division in practice, e.g., multiple units or components may be combined or may be integrated into another system, or some features may be ignored or not executed. In other respects, the coupling or direct coupling or communication connection as illustrated or discussed may be an indirect coupling or communication connection through some interfaces, apparatus, or units, and may be electrical, mechanical, or otherwise.

The units described as separate components may or may not be physically separated. Components illustrated as units may or may not be physical units, and may reside at one location or may be distributed to multiple networked units. Some or all of the units may be selectively adopted according to practical needs to achieve desired objectives of the disclosure.

In addition, various function units described in implementations herein may be integrated into one processing unit or may be presented as a number of physically separated units, and two or more units may be integrated into one.

When the functions are implemented in the form of software function units and sold or used as standalone products, the software function units may be stored in a computer readable storage medium. Based on such an understanding, the essential technical solution, or the portion that contributes to the related art, or all or part of the technical solution of the disclosure may be embodied as software products. Computer readable software may be stored in a storage medium and includes multiple instructions that, when executed, may cause a computer device, e.g., a personal computer, a server, or a network device, etc., to execute all or some operations of the methods described in various implementations of the present disclosure. The foregoing storage medium includes various kinds of media that may store program codes, such as a universal serial bus (USB) flash drive, a removable hard disk, a read-only memory (ROM), a RAM, a magnetic disk, a compact disc (CD), or the like.

It should also be noted that the above implementations are merely used to illustrate the technical solutions of the present disclosure rather than to limit the present disclosure. Although the present disclosure has been described in detail with reference to the foregoing implementations, those skilled in the art will understand that the technical solutions described in the foregoing implementations may be modified, or some or all of the technical features may be equivalently replaced. These modifications or replacements do not render the essence of the technical solutions to deviate from the scope of the technical solutions of the present disclosure and are intended to be included within the scope of the claims and the description of the disclosure.

What is claimed is:

1. A method for wireless fidelity (Wi-Fi) fast connection, comprising:
   loading a Wi-Fi driver and starting wpa_supplicant as a support library of Wi-Fi protected access (WPA), by a terminal device, after the terminal device detects that Wi-Fi is turned on by a user;
   sending a scanning command and performing a scanning operation by the terminal device, and performing in parallel therewith, by the terminal device, operations of loading pre-stored access points, setting all the pre-stored access points to be connectable, updating a current connection state, turning on Wi-Fi peer-to-peer, and setting parameters of the Wi-Fi peer-to-peer, after the terminal device determines that the wpa_supplicant is started;
   connecting to a first access point according to a scanning result of the scanning operation, by the terminal device, after the terminal device sets the parameters of the Wi-Fi peer-to-peer; and
   one of the following after connecting to the first access point according to the scanning result of the scanning operation:
      collecting, by the terminal device, access point identities (IDs), coordinate information, and time information when the terminal device connects to access points; establishing, by the terminal device, a mapping relationship table of the coordinate information, the time information, and the access point IDs; monitoring, by the terminal device, first coordinate information and first time information of the terminal device in real time; and connecting, by the terminal device, to a second access point which is selected from the mapping relationship table and corresponds to the first coordinate information and the first time information, when a relationship between the first coordinate information and the first time information matches a relationship between the coordinate information and the time information in the mapping relationship table; or
      acquiring, by the terminal device, coordinate information of the user; extracting, by the terminal device, an ID of a historical access point and the number of historical accessed times of the historical access point corresponding to the coordinate information; and connecting directly, by the terminal device, to a second access point with the greatest number of historical accessed times when the terminal device disconnects from the first access point.

2. The method of claim 1, further comprising:
   disconnecting from the first access point and saving connection information of the first access point, by the terminal device, after a screen of the terminal device is locked; and
   connecting directly to the first access point according to the connection information, by the terminal device, after the screen of the terminal device is unlocked.

3. The method of claim 1, wherein the Wi-Fi is turned on through a control command sent to the terminal device.

4. The method of claim 3, wherein control command is sent to the terminal device in a wireless manner.

5. The method of claim 1, wherein the Wi-Fi is turned on by operating a switch for turning on or turning off the Wi-Fi on a setting interface of a touch display screen of the terminal.

6. An apparatus for Wi-Fi fast connection, comprising:
   at least one processor; and
   a computer readable storage, coupled to the at least one processor and storing at least one computer executable instruction thereon which, when executed by the at least one processor, causes the at least one processor to carry out operations, comprising:
   loading a Wi-Fi driver and starting wpa_supplicant as a support library of WPA after Wi-Fi is detected to be turned on by a user;
   sending a scanning command and performing a scanning operation, and performing, in parallel with sending the scanning command and performing the scanning operation, operations of loading pre-stored access points, setting all the pre-stored access points to be connectable, updating a current connection state, turning on Wi-Fi peer-to-peer, and setting parameters of the Wi-Fi peer-to-peer, after the wpa_supplicant is determined to be started; and
   connecting to a first assess point according to a scanning result of the scanning operation after the parameters of the Wi-Fi peer-to-peer are set; and
   one of the following:
      collecting access point IDs, coordinate information, and time information when the apparatus connects to access points; establishing a mapping relationship table of the coordinate information, the time information, and the access point Ds; monitoring first coordinate information and first time information of the apparatus in real time; and connecting to a second access point which is selected from the mapping relationship table and corresponds to the first coordinate information and the first time information, when a relationship between the first coordinate information and the first time information matches a relationship between the coordinate information and the time information in the mapping relationship table; or
      acquiring coordinate information of the user; extracting an ID of a historical access point and the number of historical accessed times of the historical access point corresponding to the coordinate information; and connecting directly to a second access point with the greatest number of the historical accessed times when the apparatus disconnects from the first access point.

7. The apparatus of claim 6, wherein the at least one processor is further caused to carry out operations, comprising:
   disconnecting from the first access point and save connection information of the first access point after a screen is locked; and
   connecting directly to the first access point according to the connection information after the screen is unlocked.

8. The apparatus of claim 6, the Wi-Fi is turned on through a control command sent to the terminal device.

9. The apparatus of claim 6, wherein the Wi-Fi is turned on by operating a switch for turning on or turning off the Wi-Fi on a setting interface of a touch display screen of the terminal device.

10. A non-transitory computer readable storage medium storing program codes which, when executed by a processor, are operable with the processor to carry out actions comprising:

loading a Wi-Fi driver and starting wpa_supplicant as a support library of WPA after Wi-Fi is detected to be turned on by a user;

sending a scanning command and performing a scanning operation, and performing, in parallel therewith, operations of loading pre-stored access points, setting all the pre-stored access points to be connectable, updating a current connection state, turning on Wi-Fi P2P, and setting parameters of the Wi-Fi P2P, after the wpa_supplicant is determined to be started;

connecting to a first access point according to a scanning result of the scanning operation, after the parameters of the Wi-Fi P2P are set; and one of the following:

collecting access point IDs, coordinate information, and time information when a terminal device connects to access points; establishing a mapping relationship table of the coordinate information, the time information, and the access point Ds; monitoring first coordinate information and first time information of the terminal device in real time; and connecting to a second access point which is selected from the mapping relationship table and corresponds to the first coordinate information and the first time information when a relationship between the first coordinate information and the first time information matches a relationship between the coordinate information and the time information in the mapping relationship table; or acquiring coordinate information of the user; extracting an ID of a historical access point and the number of historical accessed times of the historical access point corresponding to the coordinate information; and connecting directly to a second access point with the greatest number of the historical accessed times when a terminal device disconnects from the first access point.

11. The non-transitory computer readable storage medium of claim 10, wherein the program codes are further operable with the processor to carry out actions comprising:

disconnecting from the first access point and saving connection information of the first access point after a screen is locked; and connecting directly to the first access point according to the connection information after the screen is unlocked.

* * * * *